United States Patent
Stenneth et al.

(10) Patent No.: US 11,343,316 B2
(45) Date of Patent: May 24, 2022

(54) HIGHLY ASSISTED DRIVING PLATFORM

(71) Applicant: HERE Global B.V., Eindhoven (NL)

(72) Inventors: Leon Oliver Stenneth, Chicago, IL (US); Vladimir Boroditsky, Northbrook, IL (US); Leo Modica, Wheaton, IL (US); Gavril Adrian Giurgiu, Chicago, IL (US); James Adeyemi Fowe, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 572 days.

(21) Appl. No.: 16/411,834

(22) Filed: May 14, 2019

(65) Prior Publication Data

US 2019/0281119 A1    Sep. 12, 2019

Related U.S. Application Data

(63) Continuation of application No. 15/460,693, filed on Mar. 16, 2017, now Pat. No. 10,334,049, which is a
(Continued)

(51) Int. Cl.
*G07C 5/00* (2006.01)
*H04L 67/12* (2022.01)
(Continued)

(52) U.S. Cl.
CPC .............. *H04L 67/12* (2013.01); *B60Q 9/008* (2013.01); *B60W 30/09* (2013.01);
(Continued)

(58) Field of Classification Search
None
See application file for complete search history.

(56) References Cited

U.S. PATENT DOCUMENTS

| 4,286,846 A | 9/1981 | Bollenbacher |
| 6,121,896 A | 9/2000 | Rahman |

(Continued)

FOREIGN PATENT DOCUMENTS

| DE | 102011000409 | 8/2012 |
| DE | 102011012139 | 8/2012 |

(Continued)

OTHER PUBLICATIONS

Bishop, Patent Filing: Google's Self-Driving Car Could Pick Up the Kids, Swervce to Avoid Deer, Apr. 5, 2012, geekwire.com.
(Continued)

*Primary Examiner* — Jonathan M Dager
(74) *Attorney, Agent, or Firm* — Lempia Summerfield Katz LLC (57) ABSTRACT

Methods for providing a highly assisted driving (HAD) service include: (a) transmitting telematics sensor data from a vehicle to a remote first server; (b) transmitting at least a portion of the telematics sensor data from the remote first server to a remote second server, wherein the remote second server is configured to execute a HAD application using received telematics sensor data, and wherein the HAD application is configured to output a HAD service result; and (c) transmitting the HAD service result from the remote second server to a client. Apparatuses for providing a HAD service are described.

20 Claims, 5 Drawing Sheets

Related U.S. Application Data continuation of application No. 14/338,957, filed on Jul. 23, 2014, now Pat. No. 9,628,565.

(51) Int. Cl.
| | |
|---|---|
| G08G 1/01 | (2006.01) |
| G08G 1/0967 | (2006.01) |
| G08G 1/16 | (2006.01) |
| B60Q 9/00 | (2006.01) |
| B60W 30/14 | (2006.01) |
| H04L 67/01 | (2022.01) |
| B60W 30/09 | (2012.01) |
| G05D 1/00 | (2006.01) |

(52) U.S. Cl.
CPC ........... *B60W 30/143* (2013.01); *G07C 5/008* (2013.01); *G08G 1/0112* (2013.01); *G08G 1/0141* (2013.01); *G08G 1/0145* (2013.01); *G08G 1/096725* (2013.01); *G08G 1/096758* (2013.01); *G08G 1/096775* (2013.01); *G08G 1/167* (2013.01); *H04L 67/42* (2013.01); *B60W 2556/55* (2020.02); *B60W 2756/10* (2020.02); *G05D 1/0088* (2013.01)

(56) References Cited

U.S. PATENT DOCUMENTS

| | | | |
|---|---|---|---|
| 6,502,035 B2 | 12/2002 | Levine | |
| 7,440,830 B2 | 10/2008 | Isaji et al. | |
| 7,457,693 B2 | 11/2008 | Olsen et al. | |
| 7,605,694 B2 | 10/2009 | Prost-fin | |
| 7,974,748 B2 | 7/2011 | Goerick et al. | |
| 8,055,403 B2 | 11/2011 | Lowrey et al. | |
| 8,164,463 B2 | 4/2012 | Omi | |
| 8,279,763 B2 | 10/2012 | Rozum et al. | |
| 8,306,848 B1 | 11/2012 | Naphade et al. | |
| 8,350,845 B2 | 1/2013 | Soulchin et al. | |
| 8,370,392 B1* | 2/2013 | Hunt | H04L 67/06 |
| | | | 707/791 |
| 8,566,126 B1* | 10/2013 | Hopkins, III | G08G 1/09 |
| | | | 705/4 |
| 8,635,018 B2 | 1/2014 | Chia et al. | |
| 8,653,986 B2 | 2/2014 | Tamir et al. | |
| 8,704,669 B2 | 4/2014 | Strumolo | |
| 8,972,484 B2 | 3/2015 | Naphade et al. | |
| 9,047,783 B2 | 6/2015 | Farrell | |
| 9,147,353 B1* | 9/2015 | Slusar | G06Q 40/08 |
| 9,189,897 B1 | 11/2015 | Stenneth | |
| 9,282,110 B2 | 3/2016 | Zhang | |
| 9,293,042 B1 | 3/2016 | Wasserman | |
| 9,349,293 B2 | 5/2016 | Beaurepaire | |
| 9,365,213 B2 | 6/2016 | Stenneth | |
| 9,440,660 B2 | 9/2016 | Sherony | |
| 9,524,269 B1* | 12/2016 | Brinkmann | G07C 5/0808 |
| 9,842,496 B1* | 12/2017 | Hayward | G07C 5/008 |
| 10,168,697 B2 | 1/2019 | Hernandez Sanchez et al. | |
| 10,185,998 B1* | 1/2019 | Konrardy | B60R 21/00 |
| 10,185,999 B1* | 1/2019 | Konrardy | G07C 5/008 |
| 10,334,049 B2* | 6/2019 | Stenneth | G08G 1/0141 |
| 11,095,741 B2* | 8/2021 | Hayes | G07C 5/008 |
| 11,151,657 B1* | 10/2021 | Allen | G06K 9/00637 |
| 2003/0073886 A1 | 4/2003 | Yanagidaira | |
| 2004/0019426 A1 | 1/2004 | Knoop et al. | |
| 2004/0023645 A1 | 2/2004 | Olsen | |
| 2004/0143385 A1 | 7/2004 | Smyth | |
| 2005/0033517 A1 | 2/2005 | Kondoh et al. | |
| 2005/0154500 A1 | 7/2005 | Sonnenrein | |
| 2005/0203683 A1 | 9/2005 | Olsen | |
| 2005/0222933 A1 | 10/2005 | Wesby | |
| 2005/0239486 A1 | 10/2005 | D'Avello | |
| 2007/0294023 A1 | 12/2007 | Arcot et al. | |
| 2008/0258890 A1 | 10/2008 | Follmer | |
| 2008/0306996 A1 | 12/2008 | Mcclellan | |
| 2010/0097178 A1 | 4/2010 | Pisz | |
| 2010/0131304 A1* | 5/2010 | Collopy | G06Q 30/0269 |
| | | | 705/4 |
| 2010/0152960 A1 | 6/2010 | Hering | |
| 2010/0274435 A1 | 10/2010 | Kondoh et al. | |
| 2011/0054716 A1 | 3/2011 | Staehlin | |
| 2011/0210866 A1 | 9/2011 | David | |
| 2011/0210867 A1 | 9/2011 | Benedikt | |
| 2012/0083960 A1 | 4/2012 | Zhu | |
| 2012/0179008 A1 | 7/2012 | Burton | |
| 2012/0253548 A1 | 10/2012 | Davidson | |
| 2013/0024060 A1* | 1/2013 | Sukkarie | G01C 21/26 |
| | | | 701/22 |
| 2013/0073377 A1 | 3/2013 | Heath | |
| 2013/0083196 A1* | 4/2013 | Zheng | G07C 5/0891 |
| | | | 348/148 |
| 2013/0131893 A1* | 5/2013 | Nakao | G07C 5/085 |
| | | | 701/1 |
| 2013/0179056 A1 | 7/2013 | Fukuyama | |
| 2013/0179198 A1* | 7/2013 | Bowne | G06Q 30/0283 |
| | | | 705/4 |
| 2013/0204455 A1 | 8/2013 | Chia | |
| 2013/0226369 A1 | 8/2013 | Yorio | |
| 2013/0255930 A1 | 10/2013 | Prakah-Asante et al. | |
| 2013/0302758 A1* | 11/2013 | Wright | H04M 1/72454 |
| | | | 434/65 |
| 2013/0304514 A1* | 11/2013 | Hyde | G06Q 40/08 |
| | | | 705/4 |
| 2013/0304980 A1 | 11/2013 | Nachimuthu | |
| 2013/0331135 A1 | 12/2013 | Novak et al. | |
| 2014/0111647 A1* | 4/2014 | Atsmon | G08G 1/04 |
| | | | 348/148 |
| 2014/0195213 A1 | 7/2014 | Kozloski | |
| 2014/0300490 A1 | 10/2014 | Kotz | |
| 2015/0015416 A1* | 1/2015 | Kim | G08G 1/164 |
| | | | 340/870.07 |
| 2015/0039350 A1* | 2/2015 | Martin | G08G 1/09626 |
| | | | 705/4 |
| 2015/0112504 A1* | 4/2015 | Binion | G06Q 40/08 |
| | | | 701/1 |
| 2015/0244826 A1* | 8/2015 | Stenneth | H04L 67/322 |
| | | | 709/213 |
| 2015/0254955 A1 | 9/2015 | Fields | |
| 2015/0276415 A1 | 10/2015 | Shrinath | |
| 2015/0294422 A1 | 10/2015 | Carver | |
| 2015/0341436 A1 | 11/2015 | Choi | |
| 2015/0346718 A1* | 12/2015 | Stenneth | G06Q 30/0611 |
| | | | 701/2 |
| 2016/0026182 A1 | 1/2016 | Boroditsky | |
| 2016/0071418 A1 | 3/2016 | Oshida | |
| 2016/0152210 A1* | 6/2016 | Fulop | B60R 25/31 |
| | | | 701/36 |
| 2016/0203652 A1* | 7/2016 | Throop | G07C 5/008 |
| | | | 701/36 |
| 2017/0085437 A1* | 3/2017 | Condeixa | H04W 24/10 |
| 2017/0113664 A1* | 4/2017 | Nix | H04N 7/188 |
| 2017/0228410 A1* | 8/2017 | Slusar | G07C 5/0841 |
| 2017/0255966 A1* | 9/2017 | Khoury | H04L 67/20 |
| 2017/0278323 A1* | 9/2017 | Gupta | H04L 63/1408 |
| 2017/0279947 A1* | 9/2017 | Rajakarunanayake | |
| | | | H04L 67/12 |
| 2017/0309172 A1 | 10/2017 | Linder | |
| 2017/0339034 A1* | 11/2017 | Lin | H04L 47/12 |
| 2018/0053354 A1* | 2/2018 | Jenkins | H04L 67/42 |
| 2018/0086350 A1* | 3/2018 | Kible | B60W 40/08 |
| 2018/0300816 A1* | 10/2018 | Perl | B60W 40/00 |
| 2018/0308190 A1 | 10/2018 | Marco | |
| 2018/0361820 A1 | 12/2018 | Dudar | |
| 2018/0367872 A1 | 12/2018 | Lucrecio | |
| 2019/0016342 A1* | 1/2019 | Fredman | B60W 50/10 |
| 2020/0233420 A1* | 7/2020 | Liu | G05D 1/0274 |

(56) References Cited

U.S. PATENT DOCUMENTS

2020/0273268 A1* 8/2020 Bhattacharyya .............................. H04L 12/40169
2021/0390497 A1* 12/2021 Hockin .............. G06Q 10/0639

FOREIGN PATENT DOCUMENTS

| DE | 102011106808 | 1/2013 |
|----|--------------|--------|
| EP | 2177878 A2 | 4/2010 |
| EP | 2234067 | 9/2010 |
| EP | 2662848 | 11/2013 |
| FR | 2972834 | 9/2012 |
| WO | WO2006073997 | 7/2006 |
| WO | WO2008127465 | 10/2008 |
| WO | WO2012092668 | 7/2012 |
| WO | WO2012117268 | 9/2012 |
| WO | WO2012156773 | 11/2012 |
| WO | WO2013072926 A2 | 5/2013 |
| WO | WO2013133791 | 9/2013 |

OTHER PUBLICATIONS

European Office Action for European Application No. 15742394.8-1203 dated Feb. 5, 2019.
PCT International Search Report and Written Opinion of the International Searching Authority dated Oct. 9, 2015 for corresponding PCT/IB2015/055241.
Sheldon Drobot et al., IntelliDrive Road Weather Research & Development—the Vehicle Data Translator, 2009, http://www.ops.fhwa.dot.gov/.
Swarun Kumar et al., A Cloud-Assisted Design for Autonomous Driving, 2012.

* cited by examiner

HIGHLY ASSISTED DRIVING PLATFORM

CROSS REFERENCE TO OTHER APPLICATIONS

This application is a continuation under 35 U.S.C § 120 and 37 C.F.R. § 1.53(b) of U.S. patent application Ser. No. 15/460,693 filed Mar. 16, 2017, which is a continuation of U.S. patent application Ser. No. 14/338,957 filed Jul. 23, 2014, now U.S. Pat. No. 9,628,565 issued Apr. 18, 2017, and each of which is hereby incorporated by reference in its entirety.

TECHNICAL FIELD

The present teachings relate generally to Highly Assisted Driving (HAD), Advanced Driver Assistance Systems (ADAS), Advanced Traveler Information Systems (ATIS), navigation systems, and the like.

BACKGROUND

Present day vehicles may be equipped with sensors to sense their internal and/or external environments. These sensors may be sampled at different frequencies and a substantial amount of sensor data may be collected over a short period of time.

Driver assistance systems may use sensors to monitor a vehicle's environment and/or a driver's movements in order to provide a highly assisted driving (HAD) service (e.g., early detection of potentially dangerous situations, collision avoidance, etc.). In some instances, HAD systems may automatically intervene to avoid or at least minimize the severity of an accident.

Different HAD applications (e.g., collision avoidance, lane departure warning, etc.) may use different amounts, sample rates, and/or latencies of sensor data. As a result, there is no inclusive platform on which all of the various HAD applications may be supported and, therefore, no way to seamlessly integrate the various HAD applications in a vehicle. Instead, different platforms are typically used for the different HAD applications.

SUMMARY

The scope of the present invention is defined solely by the appended claims, and is not affected to any degree by the statements within this summary.

By way of introduction, a method in accordance with the present teachings includes: (a) transmitting, by a processor, telematics sensor data from a vehicle to a remote first server; (b) transmitting, by the processor, at least a portion of the telematics sensor data from the remote first server to a remote second server, wherein the remote second server is configured to execute a highly assisted driving (HAD) application using received telematics sensor data, and wherein the HAD application is configured to output a HAD service result; and (c) transmitting, by the processor, the HAD service result from the remote second server to a client.

An apparatus in accordance with the present teachings includes at least one processor and at least one memory including computer program code for one or more programs. The at least one memory and the computer program code are configured to, with the at least one processor, cause the apparatus to perform at least the following: (a) transmit telematics sensor data from a vehicle to a remote first server; (b) transmit at least a portion of the telematics sensor data from the remote first server to a remote second server, wherein the remote second server is configured to execute a highly assisted driving (HAD) application using received telematics sensor data, and wherein the HAD application is configured to output a HAD service result; and (c) transmit the HAD service result from the remote second server to a client.

A non-transitory computer readable storage medium in accordance with the present teachings has stored therein data representing instructions executable by a programmed processor. The storage medium includes instructions for (a) transmitting telematics sensor data from a vehicle to a remote first server; (b) transmitting at least a portion of the telematics sensor data from the remote first server to a remote second server, wherein the remote second server is configured to execute a highly assisted driving (HAD) application using received telematics sensor data, and wherein the HAD application is configured to output a HAD service result; and (c) transmitting the HAD service result from the remote second server to a client.

DETAILED DESCRIPTION

A generic framework or platform configured to support a plurality of HAD applications has been discovered and is described herein. In accordance with the present teachings, these HAD applications may be created, executed, modified, integrated, and/or the like in a vehicle. In some embodiments, as further described herein, an architecture in accordance with the present teachings may be used to support HAD applications including but not limited to collision avoidance, early warning systems, autonomous driving, personalized autonomous driving, cruise control, lane change warning systems, an automobile app store, telematics sensor analytics, and/or the like, and combinations thereof. In some embodiments, an architecture in accordance with the present teachings is cloud-based.

In addition to being configured to support a plurality of HAD applications, an architecture in accordance with the present teachings may, in some embodiments, be further configured to achieve one or more of the following: preserve a driver's privacy; avoid overwhelming a wireless link to a cloud-based storage system with useless telematics sensor data; facilitate sharing of telematics sensor analysis results between vehicles; permit data sharing between a plurality of HAD applications since the applications are running on a common platform; facilitate seamless communication of vehicles; allow vehicles with missing or broken sensors to piggyback on sensor data harvested from a neighboring vehicle (e.g., an older-model vehicle lacking a given sensor may still exploit the corresponding sensor data via a newer-model version of the vehicle proximal thereto); prevent overwhelming of the processing power and memory of a vehicle by telematics sensor data; and/or support vehicles from more than one brand of original equipment manufacturer (OEM).

Throughout this description and in the appended claims, the following definitions are to be understood:

As used herein, the phrase "automotive cloud" refers to a cloud-based storage system. In some embodiments, a cloud-based storage system includes one or a plurality of remote servers. In some embodiments, a cloud-based storage system is configured for receiving data from one or a plurality of vehicles, transmitting data to one or a plurality of vehicles, transmitting data to one or a plurality of different cloud-based storage systems, and/or receiving data from one or a plurality of different cloud-based storage systems. In some embodiments, the transmitting and/or receiving of data between vehicles and/or servers may be achieved wirelessly.

As used herein, the phrase "personalized driving" refers to a configuration of an autonomous vehicle wherein the vehicle may drive in a style that mimics the idiosyncratic driving style of a specific individual (e.g., "Bob," "Mary," etc.) and/or a stereotypical driving style associated with a hypothetical generic driver (e.g., a "cautious" driver, an "impatient" driver, a driver transporting breakable cargo, an ambulance driver, a police officer, etc.).

It is to be understood that elements and features of the various representative embodiments described below may be combined in different ways to produce new embodiments that likewise fall within the scope of the present teachings.

By way of general introduction, a method for providing a highly assisted driving (HAD) service in accordance with the present teachings includes: (a) transmitting telematics sensor data from a vehicle to a remote first server; (b) transmitting at least a portion of the telematics sensor data from the remote first server to a remote second server; and (c) transmitting a HAD service result from the remote second server to a client. The remote second server is configured to execute a HAD application using received telematics sensor data, and the HAD application is configured to output the HAD service result.

The type of HAD application executed by the remote second server is not restricted and includes all manner of current and yet-to-be-developed HAD services that may be configured to accept telematics sensor data as an input. By way of example, representative HAD applications in accordance with the present teachings include but are not limited to autonomous driving, personalized driving of autonomous vehicles, in-vehicle navigation systems, adaptive cruise control (ACC), early warning systems, adverse weather conditions warning systems, lane departure warning systems, collision warning systems, lane change assistance, collision avoidance system (e.g., pre-crash system), intelligent speed adaptation or intelligent speed advice (ISA), night vision, adaptive light control, pedestrian protection system, automatic parking, traffic sign recognition, blind spot detection, driver drowsiness detection, vehicular communication systems, hill descent control, electric vehicle warning sounds used in hybrids and plug-in electric vehicles, telematics sensor analytics, automobile app stores, and/or the like, and combinations thereof.

In some embodiments, each of the vehicle, the remote first server, the remote second server, and the client is independently configured for wireless communication. In some embodiments, the transmitting of the telematics sensor data from the vehicle to the remote first server occurs via wireless communication. In some embodiments, the transmitting of at least the portion of the telematics sensor data from the remote first server to the remote second server occurs via wireless communication. In some embodiments, the transmitting of the HAD service result from the remote second server to the user occurs via wireless communication. In some embodiments, each of the transmitting of the telematics sensor data from the vehicle to the remote first server, the transmitting of at least the portion of the telematics sensor data from the remote first server to the remote second server, and the transmitting of the HAD service result from the remote second server to the user occurs via wireless communication.

In some embodiments, the remote first server and the remote second server are controlled by separate entities. By way of example, in some embodiments, the remote first server may be controlled by an OEM (e.g., a vehicle manufacturer), and the remote second server may be controlled by a HAD service provider. In some embodiments, the HAD service provider is Nokia (e.g., HERE).

In some embodiments, the telematics sensor data are acquired from one or a plurality of telematics sensors onboard a vehicle. Telematic sensors may be provided externally and/or internally on the vehicle. Representative telematics sensors for use in accordance with the present teachings include but are not limited to differential GPS (a.k.a. D-GPS), windshield wiping sensors, laser sensors, light sensors, camera sensors, microphone sensors, shift sensors, pedal sensors, lever sensors, brake sensors, speed sensors, acceleration sensors, headlamp sensors, steering wheel sensors, and/or the like, and combinations thereof.

In some embodiments, a method in accordance with the present teachings further includes collecting the telematics sensor data in a vehicle data collector onboard the vehicle. By way of example, in some embodiments, the vehicle data collector is provided as an onboard computer configured for storing and optionally processing telematics sensor data generated on the vehicle prior to the transmission of such data to the remote first server.

In some embodiments, a method in accordance with the present teachings further includes pre-processing at least a portion of the telematics sensor data prior to transmitting the telematics sensor data to the remote first server. In some embodiments, at least a portion of the pre-processing is performed onboard the vehicle (e.g., in the vehicle data collector). The nature of the pre-processing performed on collected telematics sensor data is not restricted and, in some embodiments, representative types of pre-processing may include but are not limited to data filtering (e.g., removing out-of-range sensor data, checking data against previously cached data for duplicates and/or redundancies, and/or the like), data anonymization (e.g., to protect driver privacy regarding identity, vehicle location, and/or the like), data compression, data enveloping, and/or the like, and combinations thereof.

In some embodiments, a method in accordance with the present teachings further includes determining whether the telematics sensor data transmitted from the vehicle to the remote first server satisfy a predefined latency threshold. In some embodiments, a method in accordance with the present teachings further includes determining whether at least the portion of the telematics sensor data transmitted to the remote second server satisfies a predefined latency threshold prior to using the received telematics sensor data as an input in the HAD application. In some embodiments, a method in accordance with the present teachings further includes determining whether the telematics sensor data transmitted from the vehicle to the remote first server satisfy a predefined first latency threshold, and determining whether at least the portion of the telematics sensor data transmitted from the remote first server to the remote second server satisfies a predefined second latency threshold. In some embodiments, the first latency threshold and the second latency threshold are the same. In other embodiments, the first latency threshold and the second latency threshold are different.

In some embodiments, a method in accordance with the present teachings further includes transmitting additional telematics sensor data from a neighboring vehicle (e.g., in some embodiments, a plurality of neighboring vehicles) to the remote first server. In some embodiments, a method in accordance with the present teachings further includes transmitting additional telematics sensor data from a neighboring vehicle (e.g., in some embodiments, a plurality of neighboring vehicles) to the remote second server. In some embodiments, a method in accordance with the present teachings further includes transmitting additional telematics sensor data from a first neighboring vehicle (e.g., in some embodiments, a plurality of first neighboring vehicles) to the remote first sever, and transmitting additional telematics sensor data from a second neighboring vehicle (e.g., in some embodiments, a plurality of second neighboring vehicles) to the remote second server. In some embodiments, the first neighboring vehicle (or plurality thereof) and the second neighboring vehicle (or plurality thereof) are the same. In other embodiments, the first neighboring vehicle and the second neighboring vehicle are different.

The collection of additional telematics sensor data from one or a plurality of neighboring vehicles may provide a crowd-sourced heuristic by which to corroborate and/or prune telematics sensor data from a primary vehicle (e.g., a vehicle that transmitted telematics sensor data to the remote first server or a vehicle that receives a HAD service result from the remote second server). In some embodiments, crowd sourcing from one or more neighboring vehicles facilitates the separation of true events and/or updates from vehicle-centric "false positives." Thus, in some embodiments, a method in accordance with the present teachings further includes corroborating at least the portion of the telematics sensor data transmitted to the remote second server via comparison and/or combination with additional telematics sensor data acquired from one or a plurality of neighboring vehicles.

As used herein the term "client" refers broadly to any type of mobile device (e.g., a vehicle and/or a component thereof, including but not limited to a navigation systems, an onboard computer, etc.; a mobile phone; and/or the like). In some embodiments, the mobile device is configured to be under at least partial manual control by a human user (e.g., a vehicle that is configured to receive one or a plurality of HAD services from a remote server). In other embodiments, the mobile device includes an autonomously driven vehicle that may or may not include any human passenger. In some embodiments, the term "client" includes a fleet (e.g., a plurality) of mobile devices each of which is configured to receive the HAD service result. In some embodiments, the client is configured to make an operational adjustment based on receipt of the HAD service result (e.g., an autonomously driven vehicle that makes a course adjustment based on receipt of a warning that a road obstruction lies ahead on the present course).

Figure 1:
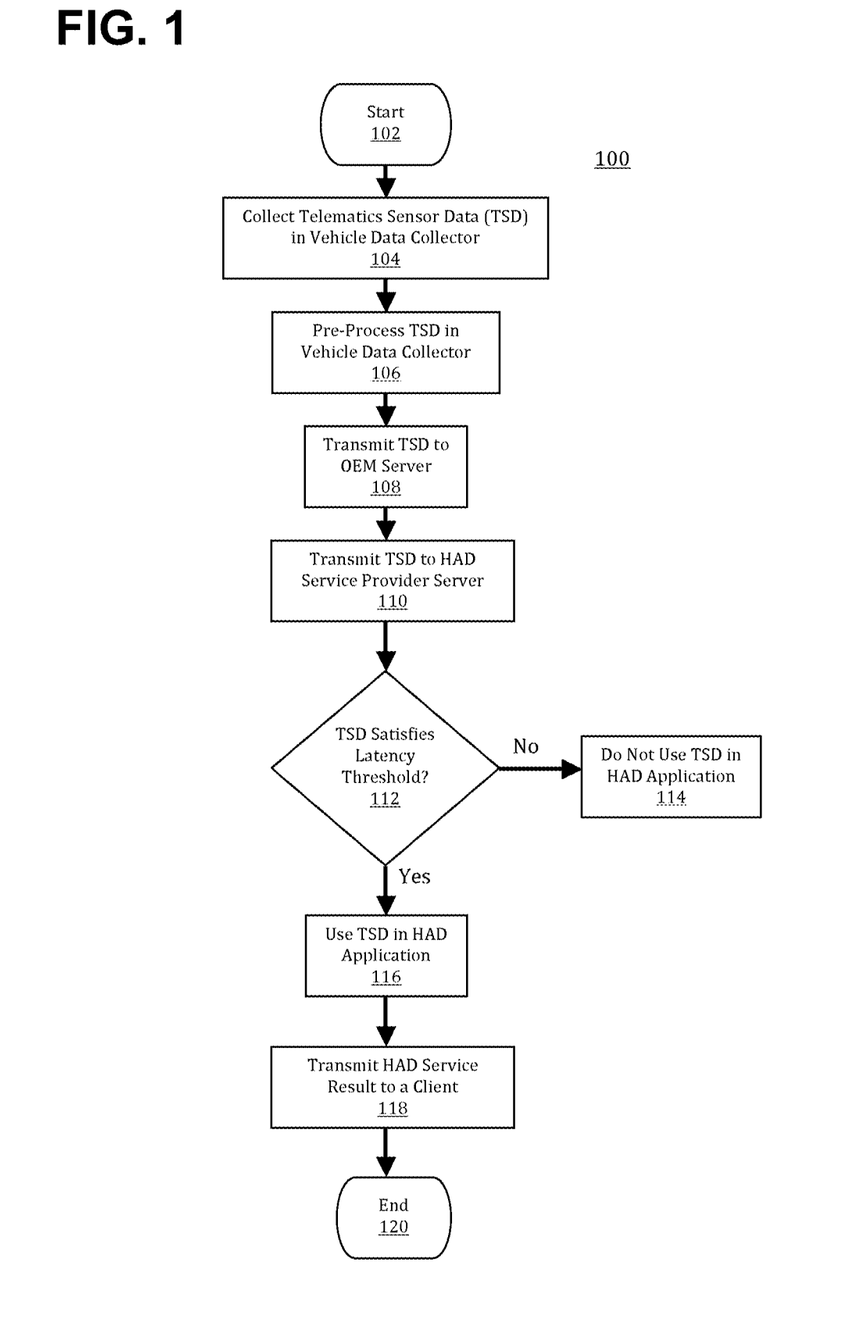
FIG. 1 shows a flow chart of an exemplary process for providing a highly assisted driving (HAD) service.

FIG. 1 shows a flow chart of a representative method 100 for providing a HAD service in accordance with the present teachings. As shown in FIG. 1, the method 100 begins at block 102 and may include collecting 104 telematics sensor data (TSD) in a vehicle data collector. The collected TSD may optionally be pre-processed as shown at block 106 and, in some embodiments, the pre-processing may take place onboard the vehicle (e.g., in the vehicle data collector). In some embodiments, the pre-processing includes anonymization of the data.

As shown at block 108 in FIG. 1, the optionally pre-processed data may be transmitted to a remote first server which, in some embodiments, is controlled by a OEM (e.g., a vehicle manufacturer). As shown at block 110, the TSD—or a least a portion thereof—may be transmitted to a remote second server which, in some embodiments, is controlled by a HAD service provider. At decision block 112, a determination may be made as to whether or not the TSD satisfy a pre-defined latency threshold. If it is determined that the TSD do not satisfy the latency threshold, the TSD are not used in a subsequent HAD application as shown at block 114. However, if the TSD do satisfy the latency threshold, the TSD may then be used in a HAD application as shown at block 116. The HAD service result generated by executing a HAD application is transmitted to a client as shown at block 118.

It is to be understood that the relative ordering of some acts shown in the flow chart of FIG. 1 is meant to be merely representative rather than limiting, and that alternative sequences may be followed. Moreover, it is likewise to be understood that additional, different, or fewer acts may be provided, and that two or more of these acts may occur sequentially, substantially contemporaneously, and/or in alternative orders. By way of example, the method shown in FIG. 1 may include additional acts including but not limited to collecting additional TSD from neighboring vehicles and/or corroborating at least the portion of the TSD via comparison and/or combination with additional telematics sensor data acquired from one or a plurality of neighboring vehicles. In addition, in some embodiments, a further determination as to whether a latency threshold has been satisfied (e.g., a second decision block analogous to decision block 112) may also be included in the process 100 (e.g., in some embodiments, interposed between acts 108 and 110).

In some embodiments, a method in accordance with the present teachings for providing a HAD service is implemented using a computer and, in some embodiments, one or a plurality of the above-described acts are performed by one or a plurality of processors. In some embodiments, one or more of the one or the plurality of processors include graphics processing units (GPUs). In other embodiments, one or more of the one or the plurality of processors include central processing units (CPUs). In some embodiments, methods in accordance with the present teachings are implemented entirely on GPUs. In some embodiments, GPUs provide improved and/or faster performance.

In some embodiments, as described above, the present teachings provide methods for providing a HAD service. In other embodiments, as further described below, the present teachings also provide apparatuses for providing a HAD service.

Figure 4:
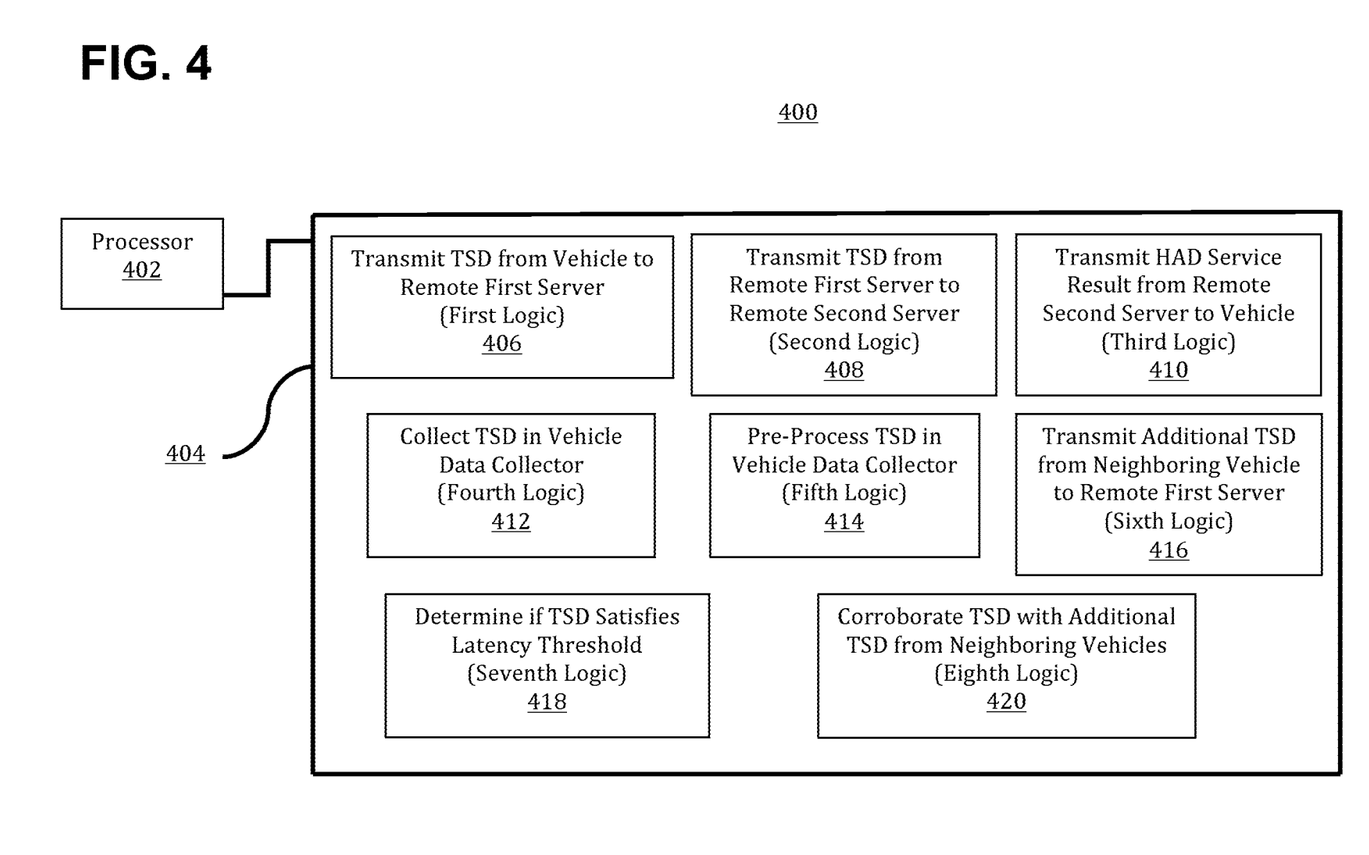
FIG. 4 shows a block diagram of a representative apparatus 400 in accordance with the present teachings for providing a HAD service.

FIG. 4 shows a block diagram of a representative apparatus 400 in accordance with the present teachings for providing a highly assisted driving HAD service. In some embodiments, as shown in FIG. 4, an apparatus 400 in accordance with the present teachings is implemented as part of a GPU in a computer system. In other embodiments, the apparatus 400 may be implemented as part of a CPU in a computer system.

In some embodiments, as shown in FIG. 4, the apparatus 400 may include: a processor 402; a non-transitory memory 404 coupled with the processor 402; first logic 406 stored in the non-transitory memory 404 and executable by the processor 402 to cause the apparatus 400 to transmit telematics sensor data (TSD) from a vehicle to a remote first server; second logic 408 stored in the non-transitory memory 404 and executable by the processor 402 to cause the apparatus 400 to transmit at least a portion of the telematics sensor data from the remote first server to a remote second server; and third logic 410 stored in the non-transitory memory 404 and executable by the processor 402 to cause the apparatus 400 to transmit an HAD service result from the remote second server to a client (e.g., a vehicle).

In some embodiments, the apparatus 400 may further include one or more of the following: fourth logic 412 stored in the non-transitory memory 404 and executable by the processor 402 to cause the apparatus 400 to collect the telematics sensor data in a vehicle data collector onboard the vehicle; fifth logic 414 stored in the non-transitory memory 404 and executable by the processor 402 to cause the apparatus 400 to pre-process at least a portion of the telematics sensor data in the vehicle data collector; sixth logic 416 stored in the non-transitory memory 404 and executable by the processor 402 to cause the apparatus 400 to transmit additional telematics sensor data from a neighboring vehicle to the remote first server; seventh logic 418 stored in the non-transitory memory 404 and executable by the processor 402 to cause the apparatus 400 to determine whether at least the portion of the telematics sensor data transmitted to the remote second server satisfies a predefined latency threshold; and/or eighth logic 420 stored in the non-transitory memory 404 and executable by the processor 402 to cause the apparatus 400 to corroborate at least the portion of the telematics sensor data transmitted to the remote second server via comparison and/or combination with additional telematics sensor data acquired from one or a plurality of neighboring vehicles.

In some embodiments, the apparatus 400 is configured as a device selected from the group consisting of navigation systems, mobile phones, personal computers, game consoles, laptops, notebooks, tablets, portable media players, personal digital assistants, pagers, and the like, and combinations thereof. In some embodiments, the apparatus 400 is configured as a navigation system and/or a mobile phone and further includes: (a) user interface circuitry and user interface software configured to (i) facilitate user control of at least some functions of the navigation system and/or mobile phone though use of a display and (ii) respond to user inputs; and (b) a display and display circuitry configured to display at least a portion of a user interface of the navigation system and/or mobile phone, the display and the display circuitry configured to facilitate user control of at least some of the functions of the navigation system and/or mobile phone.

A non-transitory computer-readable storage medium in accordance with the present teachings has stored therein data representing instructions executable by a programmed processor for providing a highly assisted driving HAD service. The storage medium includes instructions for: (a) transmitting telematics sensor data from a vehicle to a remote first server; (b) transmitting at least a portion of the telematics sensor data from the remote first server to a remote second server, wherein the remote second server is configured to execute a HAD application using received telematics sensor data, and wherein the HAD application is configured to output a HAD service result; and (c) transmitting the HAD service result from the remote second server to a user.

The following description and representative implementations illustrate features in accordance with the present teachings, and are provided solely by way of illustration. They are not intended to limit the scope of the appended claims or their equivalents.

In some embodiments, the sensor data emanating from vehicles may be archived and/or processed on the vehicle itself. In other embodiments, the sensor data may be archived and/or processed in an automotive cloud (e.g., in a HAD service provider's cloud). In some embodiments, the archiving and processing may take place on both the vehicle itself and in one or a plurality of automotive clouds.

Processing and archiving the sensor data on the vehicle itself may strain the vehicle's resources (e.g., CPU processing power and/or memory). On the other hand, if all of the sensor data are sent to the automotive cloud, the bandwidth of the wireless service providers may be overwhelmed, which can be costly. Accordingly, in some embodiments, the TSD may be compressed before transmission. In addition or alternatively, in some embodiments, the TSD may be filtered in order to weed out unnecessary and/or low quality data on the vehicle, such that only the high quality data are transmitted to the cloud. In some embodiments, a combination of both in-car data processing and automotive cloud processing is performed. By way of example, in some embodiments, processing that relates to critical decisions (e.g., imminent accident warnings) may be performed on the vehicle. Other processing associated with decisions that do not require immediate reactions and that involve longer event horizons (e.g., based on adverse weather conditions warnings a few miles down the road) may be performed in the cloud.

In some embodiments, combining sensor information from co-located (e.g., neighboring) vehicles may increase confidence levels of the derived HAD service results (e.g., warnings about dangerous driving conditions and/or collision avoidance). Direct communication between vehicles is known as vehicle-to-vehicle (V2V) communication. Communication between vehicles via external clouds is known as vehicle-to-infrastructure (V2I) communication. In some embodiments, V2I communication may be used as a mechanism of communication in autonomous driving (e.g., for communication between connected cars and a computer cloud). For example, if multiple vehicles detect adverse weather conditions in a certain region (e.g., heavy rain, icy roads, and/or the like), other vehicles approaching the region may be informed of the adverse weather conditions by continuously communicating with the automotive cloud.

In accordance with the present teachings, driver privacy may be protected. By way of example, in some embodiments, privacy concerns may be addressed by using a plurality of remote servers (e.g., two or more automotive clouds). In some embodiments of a multi-cloud system, the personal details of the driver and/or identifying information relating to the vehicle and/or its location may be addressed at the OEM level. For example, the data may first be anonymized (e.g., on the vehicle) and then sent to the OEM's server and/or sent to the OEM server and then anonymized there. Subsequently, the sanitized data may be forwarded to a HAD service provider's cloud (e.g., HERE automotive cloud).

In accordance with the present teachings, data sharing between different OEMs may be achieved. For example, data from a vehicle manufactured by a first OEM and data from a vehicle manufactured by a second OEM may both be archived in a HAD service provider's automotive cloud. By executing a HAD application, (e.g., collision warning, personalized driving, cruise control, and/or the like), telematics sensor analytics from the first OEM may be used to trigger behaviors on a vehicle manufactured by the second OEM. Since different HAD applications may require different granularities and/or different frequencies of sensor data, a HAD platform of a type described herein may be used to support the various applications.

Figure 2:
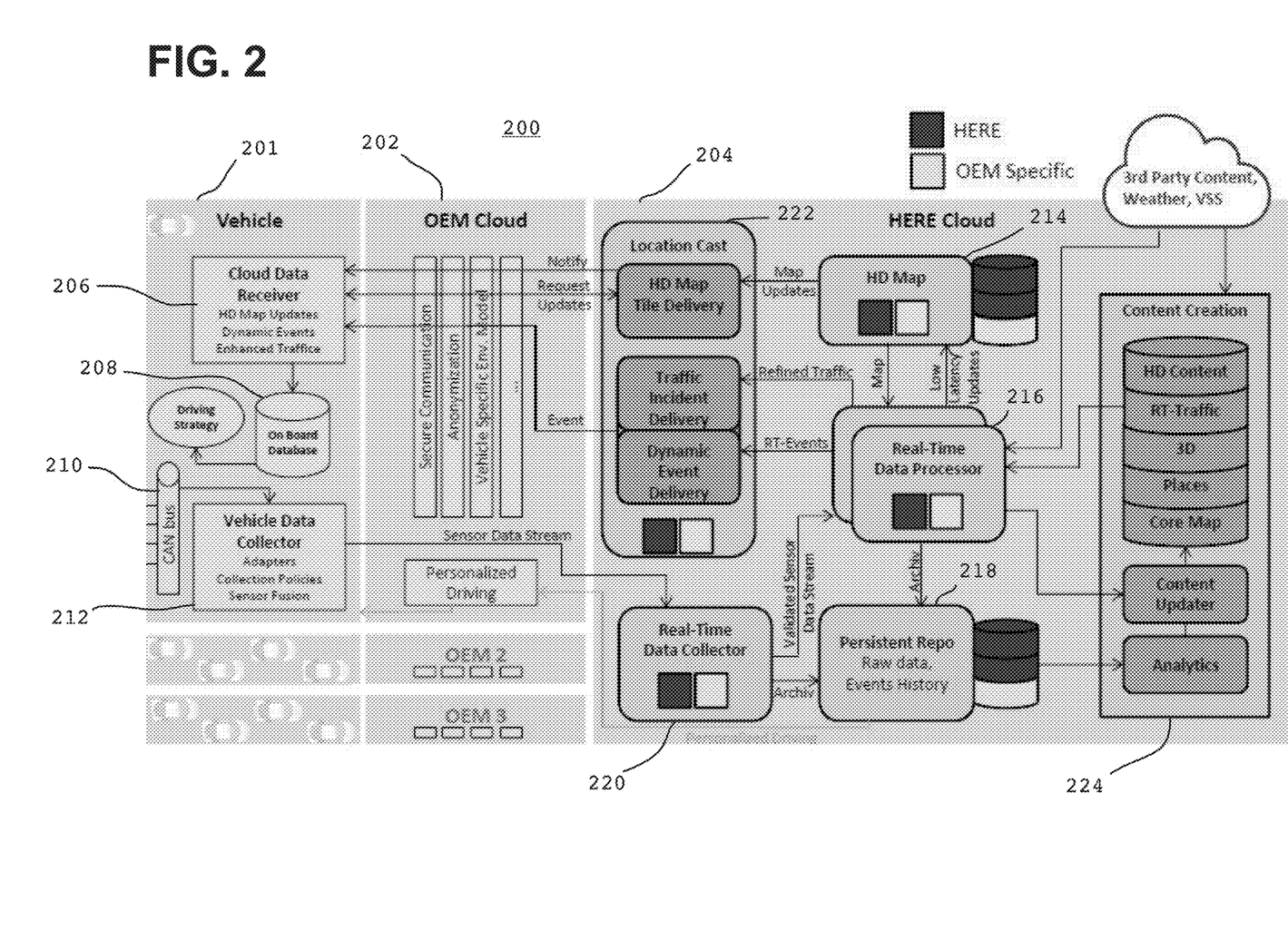
FIG. 2 shows an exemplary architecture of a system for providing a HAD service in accordance with the present teachings.

FIG. 2 shows an exemplary architecture 200 of a system for providing a HAD service in accordance with the present teachings. FIG. 2 depicts representative subsystems of the architecture 200 and their connectivities. As shown in FIG. 2, the architecture 200 includes two remote servers (e.g., clouds) in communication with one another and with a vehicle 201. The two remote servers include OEM cloud 202 and HAD service provider cloud 204 (e.g., HERE). Representative elements and acts that are controlled by and/or associated with the OEM cloud 202 are shown in FIG. 2 using beige shading. In some embodiments, as shown in FIG. 2, the OEM-controlled elements and acts include a cloud data receiver 206, an onboard database 208, a controller area network (CAN) bus 210, and a vehicle data collector 212.

Representative elements and acts that are controlled by and/or associated with the HAD service provider cloud 204 are shown in FIG. 2 using blue shading. In some embodiments, as shown in FIG. 2, the HAD service provider-controlled elements and acts include a HD map 214, a real time data processor 216, a persistent repository 218, a real time data collector 220, a location cast part 222, and a content creation part 224.

Information may be hidden from a vehicle's one or more sensors due to obstacles along a sensor's line of sight. By way of example, a pedestrian may be hidden from view at an intersection and/or a traffic sign may be hidden by a large vehicle in front of the one or more sensors. In such situations, the vehicle from which information is hidden may rely on sensor data from one or more other vehicles ahead of it that already submitted data to the automotive cloud. However, in some cases, front vehicle information may not be available. For example, even if there are no obstacles along a sensor's line of sight, the sensors may be limited in range and, therefore, may be unable to accurately report long-range data. As a result, the vehicle's ability to plan ahead may be limited. To address this issue, as shown in FIG. 2, the automotive cloud 204 may provide detailed HERE 3D maps, traffic information, dynamic content (e.g., parking availability, low-price gas stations, points of interest along a route, and/or the like), incident information, and/or the like to vehicles connected to the cloud 204, thereby extending the sensor spatial range of those vehicles.

As described above, the architecture 200 shown in FIG. 2 involves an OEM and a HAD service provider. Original equipment manufacturers may lack the resources to build and maintain large automotive clouds and to build the mathematical models used for sensor data fusion and HAD service result predictions (e.g., road conditions). As a result, OEMs may not provide HAD services themselves. Since the OEM may not have accurate 3D maps to be used, for example, in HAD applications, the OEM may be send its data to a third party service provider (e.g., HERE) to build HAD services on its behalf.

By way of example, as shown in FIG. 2, vehicle data may be initially controlled by the OEM. The vehicle data generated may be collected by the vehicle data collector 212 onboard the vehicle 201. The vehicle data collector 212 may be configured to perform basic TSD filtering. For example, duplicate and/or out-of-range sensor data may be suppressed by the vehicle data collector 212. As a result of this suppression, unwanted and corrupted data are not sent to the clouds.

Various types of data filtering and preprocessing schemes may be employed in accordance with the present teachings. For example, in some embodiments, predefined ranges may be stored on the vehicle 201. When sensor data go beyond the stored predefined ranges, then that sensor data may be pruned. For example, if a stored predefined range of latitude values is between 0 and 90, latitude values greater than 90 and less than 0 obtained from a D-GPS telematics sensor may be filtered. In some embodiments, all sensor data may be temporarily cached for a predefined period of time in the onboard database 208 of the vehicle 201. New TSD may be checked against previously cached data for duplicates and/or redundancies.

In the representative architecture 200 shown in FIG. 2, data from the vehicle data collector 212 may be sent to the OEM cloud 202. In some embodiments, a secure wireless communication line may be provided between the vehicle 201 and the OEM cloud 202. After preprocessing (e.g., in the vehicle data collector 212), as further described below, the TSD may be anonymized, compressed, and/or enveloped before transmission to the OEM cloud 202.

An anonymization process may be used to protect driver privacy including but not limited to personal information (e.g., name, age, address, phone number, and/or the like), exact location (e.g., at home, at a doctor's office, at a rehab center, and/or the like). All manner of anonymization schemes are contemplated for use in accordance with the present teachings, including but not limited to k-anonymity.

Compression is a bandwidth conservation scheme that may be used to reduce the size of the TSD before putting the data over the communication link. All manner of compression or archiving schemes are contemplated for use in accordance with the present teachings, including but not limited to zipping. In some embodiments, compression may be used in connection with driverless cars, which may produce large amounts of data (e.g., 1 Gb/s of data).

Enveloping may be used convert the TSD to an understandable format to facilitate processing by the OEM and/or the HAD service provider.

The TSD may be transferred from the OEM cloud 202 to the HAD service provider cloud 204. Various techniques may be used to handle latency issues for transferring data from the vehicle 201 to the OEM cloud 202 and/or from the OEM cloud 202 to the HAD service provider cloud 204. In some embodiments, TSD latency thresholds may be predefined for each HAD service (e.g. automatic wiper blade activation). For example, if the latency threshold is defined to be less than or equal to 30 seconds, sensor data that is older than 30 seconds may not be used as an input in an HAD application (e.g., determining whether or not to activate the automatic wiper blades). To determine if a threshold has been breached, the latency threshold, current time, and timestamp of the TSD received in the HAD service provider cloud 204 may be checked before the data are used to output a HAD service result.

Figure 3:
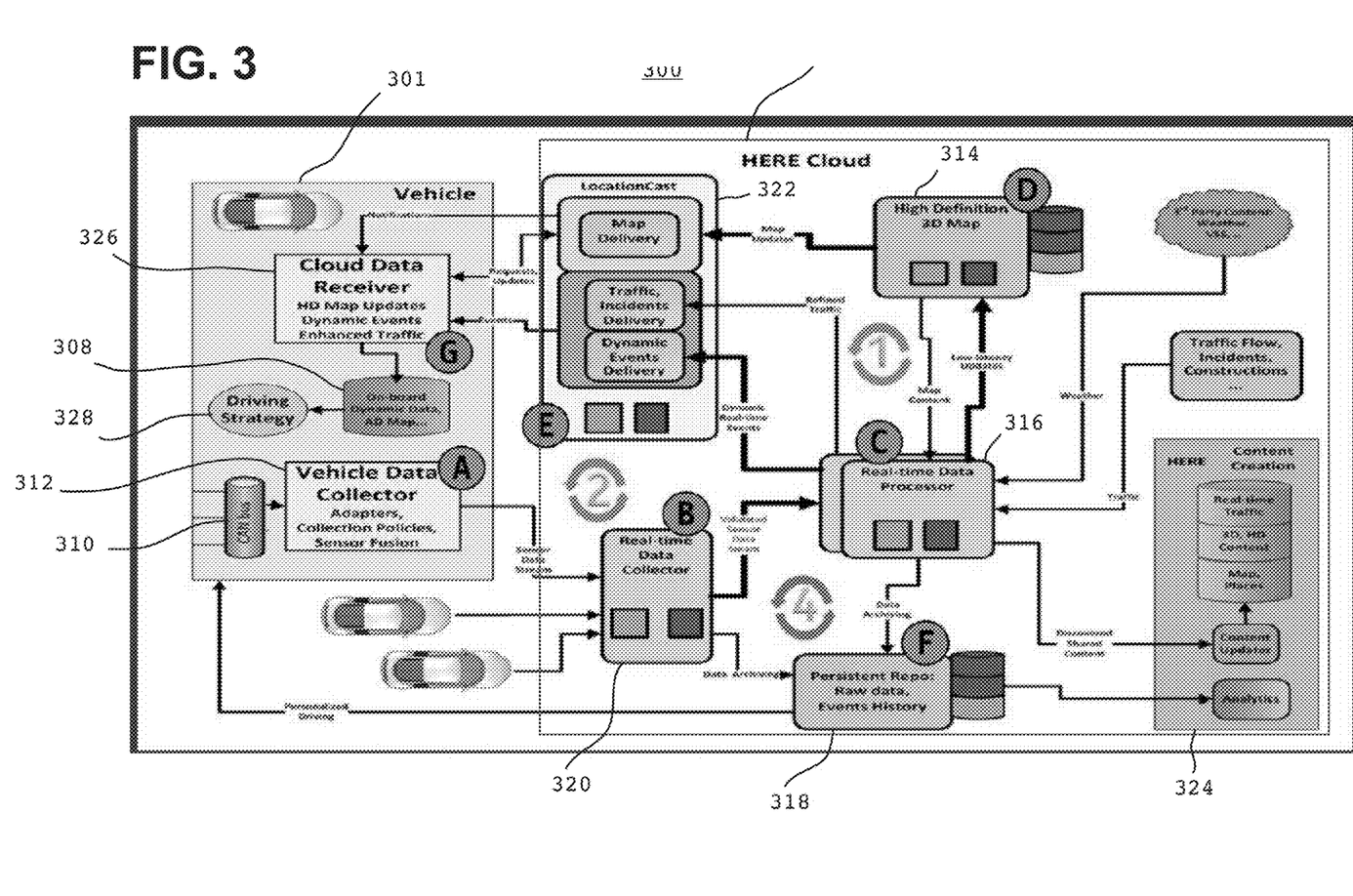
FIG. 3 shows a schematic illustration of exemplary relationships between system components in an exemplary architecture in accordance with the present teachings.

As further described below in reference to FIG. 3, different pathways may be followed once the data arrive in the HAD service provider cloud 204. FIG. 3 shows a schematic illustration of exemplary relationships and data flow pathways that may exist between representative system components and acts in an end-to-end (E2E) cloud-based architecture 300 in accordance with the present teachings. In some embodiments, the architecture 300 implements three closed loops to support delivery of HAD services from the HAD service provider cloud 304 to a fleet of clients (e.g., vehicles). The three representative loops shown in FIG. 3 correspond to three assisted driving domains. More specifically, loop 1 corresponds to real world reference data (e.g., from a 3D map), loop 2 corresponds to real time environmental data indicative of a status of an environment of the vehicle (e.g., weather, traffic, incidents, and/or the like), and loop 4 corresponds to personalized driving.

Each of loops 1, 2, and 4 begins at vehicle data collector 312. The vehicle data collector 312 is configured to collect sensor data, to extract observed events to the extent possible onboard the vehicle, and to send information to the automotive cloud. In some embodiments, the data may first be sent to the OEM cloud 202 as shown in FIG. 2. As shown in FIG. 3, the data may be collected by the real time data collector 320 and sent to the real time data processor 316. In addition, the data may be stored in the persistent repository 318.

In loop 1 shown in FIG. 3, the real time data processor 316 may be configured to extract map updates from the incoming telematics sensor stream applying crowd-sourced heuristics and rules, and to send the extracted map updates to the high definition 3D map 314. For example, if the vehicle 301 determines that the real road is not well described by the map, a map update message may be triggered and the map may be updated using the route of the vehicle and, possibly, the routes of other vehicles that have observed the same deviations of the map from the real road. The map 314 may validate and/or apply the updates, publish the updates, and/or broadcast notifications to the vehicles through the location cast part 322.

The relevant map updates may be received in a requesting vehicle in a cloud data receiver 326. The onboard map data repository of the vehicle 301 is updated and may be used in defining driving strategy 328. As used herein the, term "relevant" as used in reference to map updates signifies that a vehicle may update a map in only a region that corresponds to its current location. By way of example, updates in South America may not be effected by vehicles in Europe. Similarly, by way of further example, map updates in Germany would not be taken by a car that never leaves France. In some embodiments, algorithms may be developed that determine what "relevant" means in a given situation. For example, the location history of a vehicle may be analyzed to provide a vehicle-specific "relevant area" that may be stored in the vehicle and/or in an automotive cloud depending on the vehicle's computing resources and/or other factors. Thus, updates in the "relevant area" may be taken with first priority. As the vehicle drives to new locations, the "relevant area" may expand in response. In some embodiments, update priority may be determined based on factors such as time, memory/storage, and computer processing resources available on the vehicle, and/or the like, and combinations thereof.

In loop 2 shown in FIG. 3, the real time data processor 316 is configured to extract dynamic events from the incoming stream. As used herein, the phrase "dynamic events" describes events such as traffic, incidents, weather, and/or the like, and combinations thereof. In some embodiments, the categorization of an event as being dynamic as opposed to static may be based on crowd-sourced heuristics and rules. For example, an incident may be determined with confidence based on the number of other vehicles reporting the incident. In some embodiments, the real time data processor 316 is further configured to refine other dynamic information (e.g., traffic flow, incidents, weather, and/or the like), fuse the other dynamic information with the extracted dynamic events, and send information to the vehicles with low latency through the location cast part 322. In some embodiments, only potentially affected vehicles receive the information.

In loop 4 shown in FIG. 3, data about the applications (e.g., personal driving styles, collision avoidance data, and/or other vehicle applications) may be accumulated in a persistent repository 318 and used, for example, by OEM analytics to identify appropriate adjustments to the driving strategy 328. These adjustments may periodically be refined and loaded to the vehicle 301.

In some embodiments, the HAD service provider cloud 304 implements a platform as a service for partners of the HAD service provider. The platform may support a clear and logical separation of proprietary information streams, data layers, and/or processing modules in each of the major system components (e.g., in FIG. 3, yellow corresponds to the OEM and blue corresponds to the HAD service provider).

Road situations may be complex. Even for a relatively simple scenario such as determining a Variable Speed Sign (VSS) at the lane level, complexities may develop. For example, the reported VSS value may vary significantly depending on factors such as the position of a reporting vehicle, temporary or permanent obstacles that obstruct observation (e.g., trucks, trees, blind spots, and/or the like), positioning system accuracy, sophistication of the sensor vehicle instrumentation, and/or the like, and combinations thereof. Thus, the system collecting data across the fleet may apply data fusion and/or crowd-sourcing techniques to determine the values with the highest possible confidence.

The real time data processor 316 shown in FIG. 3 may serve as a confidence-building engine configured to identify and increase confidence in a discovered event. In some embodiments, as further described below, a real time data processor may implement at least the following processes: (1) implement sensor fusion algorithms; (2) apply crowd-sourced rules; and (3) fuse discovered dynamic events with other dynamic content.

Sensor fusion algorithms for the data coming from a particular vehicle may be implemented by a real time data processor. The observed events may be extracted with a computed confidence available at the vehicle level. By way of example, the observed event may include low visibility due to fog. The vehicle's right camera reports the presence of a VSS 200 meters ahead with 50% probability. However, the VSS is not in the map. The vehicle's left camera, on the other hand, reports the VSS 250 meters ahead with 75% probability. Statistical algorithms fuse information from the right camera and the left camera to report a VSS 240 meters ahead with 85% probability. Similar algorithms may be applied to reported speeds and/or the like.

Crowd-sourced rules may be applied across a subset of the fleet based on location. The application of these rules may help to separate true events and/or updates from vehicle-centric "false positives." By way of example, the deviation of a car trajectory from the map may be due to the map being out-of-date, construction in the area altering the traffic flow, congestion forcing cars to drive on a shoulder, and/or the like. Thus, confirmation from multiple vehicles may be a prerequisite to triggering a map update. At this stage, the discovered map updates may be delivered to the map engine for application.

The discovered dynamic events may be fused with other dynamic content (e.g., weather data from sensors of other vehicles) to further increase confidence levels and deliver the results to the fleet. For example, the combination of information from a first vehicle reporting slippery/icy roads and information from a second vehicle reporting multiple engagements of an ABS is indicative of a conclusion of dangerous driving conditions.

One skilled in the art will appreciate that one or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Figure 5:
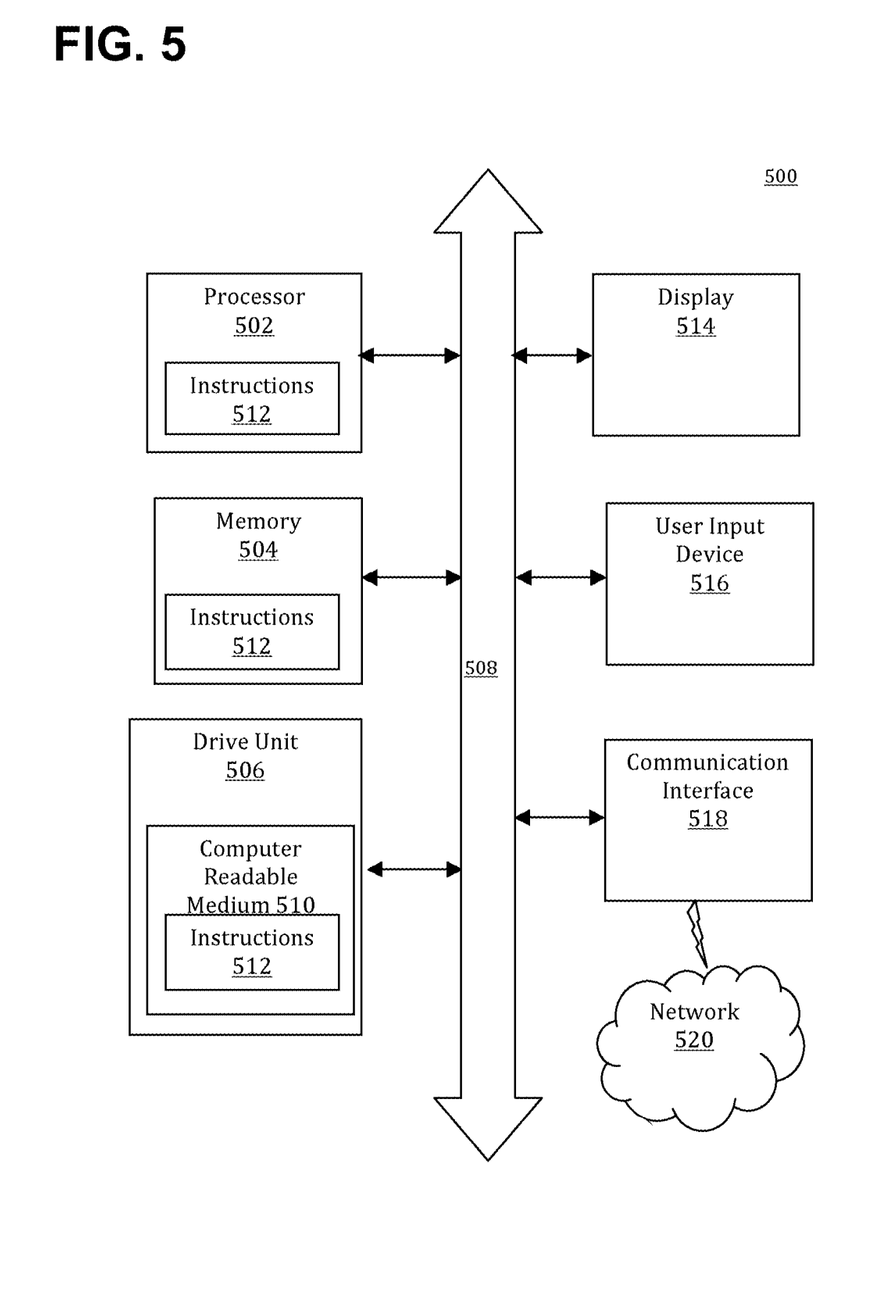
FIG. 5 shows a representative general computer system 500 for use with an apparatus in accordance with the present teachings.

FIG. 5 depicts an illustrative embodiment of a general computer system 500. The computer system 500 can include a set of instructions that can be executed to cause the computer system 500 to perform any one or more of the methods or computer based functions disclosed herein. The computer system 500 may operate as a standalone device or may be connected (e.g., using a network) to other computer systems or peripheral devices. Any of the components discussed above, such as the processor, may be a computer system 500 or a component in the computer system 500. The computer system 500 may implement a HAD module for providing a highly assisted driving HAD service, of which the disclosed embodiments are a component thereof.

In a networked deployment, the computer system 500 may operate in the capacity of a server or as a client user computer in a client-server user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As shown in FIG. 5, the computer system 500 may include a processor 502, for example a central processing unit (CPU), a graphics-processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc (CD), digital video disc (DVD), memory card, memory stick, floppy disc, universal serial bus (USB) memory device, or any other device operative to store data. The memory 504 is operable to store instructions executable by the processor 502. The functions, acts or tasks illustrated in the figures or described herein may be performed by the programmed processor 502 executing the instructions 512 stored in the memory 504. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown in FIG. 5, the computer system 500 may further include a display unit 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, as shown in FIG. 5, the computer system 500 may include an input device 516 configured to allow a user to interact with any of the components of system 500. The input device 516 may be a number pad, a keyboard, or a cursor control device, such as a mouse, or a joystick, touch screen display, remote control or any other device operative to interact with the system 500.

In some embodiments, as shown in FIG. 5, the computer system 500 may also include a disk or optical drive unit 506. The disk drive unit 506 may include a computer-readable medium 510 in which one or more sets of instructions 512 (e.g., software) can be embedded. Further, the instructions 512 may embody one or more of the methods or logic as described herein. In some embodiments, the instructions 512 may reside completely, or at least partially, within the memory 504 and/or within the processor 502 during execution by the computer system 500. The memory 504 and the processor 502 also may include computer-readable media as described above.

The present teachings contemplate a computer-readable medium that includes instructions 512 or receives and executes instructions 512 responsive to a propagated signal, so that a device connected to a network 520 can communicate voice, video, audio, images or any other data over the network 520. Further, the instructions 512 may be transmitted or received over the network 520 via a communication interface 518. The communication interface 518 may be a part of the processor 502 or may be a separate component. The communication interface 518 may be created in software or may be a physical connection in hardware. The communication interface 518 is configured to connect with a network 520, external media, the display 514, or any other components in system 500, or combinations thereof. The connection with the network 520 may be a physical connection, such as a wired Ethernet connection or may be established wirelessly as discussed below. Likewise, the additional connections with other components of the system 500 may be physical connections or may be established wirelessly.

The network 520 may include wired networks, wireless networks, or combinations thereof. The wireless network may be a cellular telephone network, an 802.11, 802.16, 802.20, or WiMax network. Further, the network 520 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of subject matter described in this specification can be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination thereof).

In some embodiments, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations can include distributed processing, component/object distributed processing, and parallel processing. Alternatively, virtual computer system processing can be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, some embodiments of subject matter described herein can be implemented on a device having a display, for example a CRT (cathode ray tube) or LCD (liquid crystal display) monitor, for displaying information to the user and a keyboard and a pointing device, for example a mouse or a trackball, by which the user can provide input to the computer. Other kinds of devices can be used to provide for interaction with a user as well. By way of example, feedback provided to the user can be any form of sensory feedback (e.g., visual feedback, auditory feedback, or tactile feedback); and input from the user can be received in any form, including but not limited to acoustic, speech, or tactile input.

Embodiments of subject matter described herein can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include but are not limited to a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

We claim:

1. A method comprising:
   identifying telematics sensor data;
   selecting a first threshold for a data parameter of the telematics sensor data, the first threshold corresponding to a first driving assistance service;
   selecting a second threshold for the data parameter of the telematics sensor data, the second threshold corresponding to a second driving assistance service;
   performing a comparison of the telematics sensor data to the first threshold and the second threshold; and
   providing the telematics sensor data to the first driving assistance service or the second driving assistance service in response to the comparison.

2. The method of claim 1, wherein the first threshold or the second threshold is an amount of time.

3. The method of claim 1, wherein the data parameter is latency.

4. The method of claim 1, further comprising:
   sending an instruction from a cloud server, in response to the comparison, for autonomous driving.

5. The method of claim 1, further comprising:
   identifying a current time; and
   identifying a timestamp from the telematics sensor data, wherein the comparison is a comparison of a difference between the current time and the timestamp to the first threshold or the second threshold.

6. The method of claim 1, wherein the first driving assistance service is associated with automatic wiper blades.

7. The method of claim 1, wherein the first driving assistance service is associated with adaptive cruise control (ACC), early warning systems, adverse weather conditions warning systems, lane departure warning systems, collision warning systems, lane change assistance, collision avoidance system, intelligent speed adaptation or intelligent speed advice (ISA), night vision, adaptive light control, pedestrian protection system, automatic parking, traffic sign recognition, blind spot detection, driver drowsiness detection, or hill descent control.

8. The method of claim 1, wherein the telematics sensor data is collected by a windshield wiping sensor, a laser sensor, a light sensor, a camera sensor, a microphone sensor, a shift sensor, a pedal sensor, a lever sensor, a brake sensor, a speed sensor, an acceleration sensor, a headlamp sensor, or a steering wheel sensor.

9. The method of claim 1, further comprising:
   receiving the telematics sensor data at an automotive cloud device.

10. The method of claim 9, wherein the automotive cloud device is associated with a plurality of manufacturers.

11. The method of claim 1, further comprising:
    anonymizing the telematics sensor data to protect user privacy, wherein the anonymized telematics sensor data is provided to the first driving assistance service or the second driving assistance service.

12. The method of claim 1, further comprising:
    compressing the telematics sensor data, wherein the compressed telematics sensor data is provided to the first driving assistance service or the second driving assistance service.

13. The method of claim 1, further comprising:
    enveloping the telematics sensor data to a predetermined format, wherein the enveloped telematics sensor data is provided to the first driving assistance service or the second driving assistance service.

14. An apparatus comprising:
    at least one processor; and
    at least one memory including computer program code for one or more programs, the at least one memory and the computer program code configured to, with the at least one processor, cause the apparatus to perform at least the following:
    identifying telematics sensor data;
    selecting a first threshold for a data parameter of the telematics sensor data, the first threshold corresponding to a first autonomous driving application;
    selecting a second threshold for the data parameter of the telematics sensor data, the second threshold corresponding to a second autonomous driving application;
    performing a comparison of the telematics sensor data to the first threshold and the second threshold; and
    providing the telematics sensor data to the first autonomous driving application or the second autonomous driving application in response to the comparison.

15. The apparatus of claim 14, wherein the first threshold or the second threshold is an amount of time.

16. The apparatus of claim 14, wherein the data parameter is latency.

17. The apparatus of claim 14, the at least one memory and the computer program code configured to, with the at least one processor, cause the apparatus to perform:
    generating an instruction, in response to the comparison, to execute a driving application for an autonomous driving command.

18. The apparatus of claim 14, the at least one memory and the computer program code configured to, with the at least one processor, cause the apparatus to perform:
    identifying a current time; and
    identifying a timestamp from the telematics sensor data, wherein the comparison is a comparison of a difference between the current time and the timestamp to the first threshold or the second threshold.

19. A non-transitory computer readable medium including instructions that when executed cause a processor to perform:
    identifying telematics sensor data;
    selecting a first threshold for a data parameter of the telematics sensor data, the first threshold corresponding to a first driving assistance service;
    selecting a second threshold for the data parameter of the telematics sensor data, the second threshold corresponding to a second driving assistance service;
    performing a comparison of the telematics sensor data to the first threshold or the second threshold; and
    providing the telematics sensor data to the first driving assistance service or the second driving assistance service in response to the comparison.

20. The non-transitory computer readable medium of claim 19, wherein the first threshold or the second threshold is an amount of time.

* * * * *